United States Patent Office 3,592,782
Patented July 13, 1971

3,592,782
LATENT FOAMING COMPOSITION AND METHOD FOR THE PREPARATION THEREOF
Christian A. Weber, Sanford, and Donald H. Clarke, Essexville, Mich., assignors to The Dow Chemical Company, Midland, Mich.
No Drawing. Filed Nov. 29, 1968, Ser. No. 780,213
Int. Cl. C08f 27/12, 45/30, 47/10
U.S. Cl. 260—2.5    10 Claims

ABSTRACT OF THE DISCLOSURE

Expandable microspheres incorporated in latent foaming polyhalostyrene compositions provides a fine-celled foam product.

---

This invention relates to latent foaming halostyrene polymers, and more particularly relates to a method for the preparation of latent foaming polymeric compositions and foams therefrom.

Oftentimes it is desirable to prepare latent foaming polymeric compositions by a casting process wherein a monomeric composition containing suitable catalyst blowing agents are cast within a mold, polymerized at relatively low temperatures to provide a thermoplastic expandable resinous composition, the material subsequently removed from the mold and the temperature thereof raised to a foaming temperature wherein the composition forms a plurality of closed gas-filled cells and expands to a volume substantially greater than its original volume. Particularly advantageous for such latent foaming compositions are halostyrenes, such as chlorostyrene, which will polymerize readily. Suitable catalysis occurs at relatively low temperatures, such temperatures being less than the temperature required to volatilize a liquid blowing agent or decompose a solid blowing agent. Foamable chlorostyrene compositions are set forth in British Pats. 1,041,596 and 1,094,516. Beneficially, the polymerizable portion is diluted with a soluble polymer which reduces the heat liberated during polymerization in the present of the blowing agent; or alternately, the monomer may be partially converted to polymer to provide a prepolymer syrup which can be cooled, formulated with blowing agent, catalyst and microspheres or other additives to provide a polymerizable mixture with reduced heat of polymerization. When such compositions are blown with a volatile liquid blowing agent alone without the addition of a chemical blowing agent such as oxy-bis(benzene sulfonyl hydrazide), coarse or large cell material is obtained. Frequently, it is undesirable to employ a thermally degradable blowing agent in conjunction with a volatile liquid blowing agent.

Blowing agents employed for the expandable thermoplastic resinous material may be any of those which are commercially utilized for such purposes, including such fugacious materials as trichlorofluoromethane, dichlorotetrafluoroethane, trichlorotrifluoroethane, pentanes, hexanes and other low boiling hydrocarbons well known as expanding or blowing agents. As is apparent, the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 1 and 20 weight percent or so of such fugacious materials as trichlorofluoromethane, dichlorotetrafluoroethane, trichlorotrifluoroethane or pentane may be employed. The fugacious or gaseous blowing agents may be incorporated into the thermoplastic material by any technique suitable for the purpose including such procedures as placing certain of such agents in the polymerization mass in which the thermoplastic polymer is prepared so as to thereby incorporate efficient amounts of the blowing agent in the polymer and directly provide an expandable product.

Compositions in accordance with the present invention comprise (a) an unsaturated polymerizable substance which is o-chlorostyrene, m-chlorostyrene, p-chlorostyrene, dichlorostyrenes, methyl methacrylate and mixtures thereof with up to 30 weight percent styrene based on the weight of the polymerizable substances, (b) a volatile liquid expanding agent present in a proportion of from about 3 to about 30 weight percent, and (c) 0.2 to 10 weight percent, advantageously from about 0.2 to 1 weight percent, of thermoplastic synthetic resinous particles having a diameter of from about 1 to 50 microns and containing a volatile fluid foaming agent encapsulated therein as a distinct and separate liquid phase, the percentages being based on the total weight of the composition.

Expandable particles of microspheres suitable for the practice of the present invention are well known and are described in Belgian Pat. 641,711 and British Pat. 736,432. Beneficially, the expandable microspheres useful in the practice of the present invention are those microspheres having a composition such that the polymer shell is not attacked by components (a) and (b). Of particular benefit are the microspheres prepared having a shell of a copolymer of a major portion of vinylidene chloride and acrylonitrile containing pentane as a volatile fluid foaming agent.

By way of further illustration, a plurality of samples are prepared in the following manner: a solution of 300 parts by weight of polychlorostyrene is prepared in 700 parts by weight of monochlorostyrene. A mixture of one part by weight of divinylbenzene in 150 parts by weight of difluorodichloromethane is added to the polychlorostyrene solution. Ten parts by weight of microspheres are added to the mixture and dispersed therethrough with agitation. The microspheres have a shell of a copolymer of 75 weight percent vinylidene chloride and 25 weight percent acrylonitrile and contain about 30 weight percent pentane as a distinct and separate liquid phase encapsulated within the shell, the shells having diameters from about 3 to 5 microns. When a uniform dispersion is obtained, 2 parts by weight of isopropyl percarbonate are added and the composition cast into cups. The cups containing the polymerizable composition are allowed to stand at 40° C. for about 10 days and subsequently placed in an air oven at 155° C. until foaming has occurred. Each of the samples expand to about the same volume. The results are set forth in the following table.

TABLE

| Sample identification: | Cell Size Millimeter |
|---|---|
| (1)—Expandable microspheres; vinyl chloride-acrylonitrile copolymer shell | 0.1–0.15 |
| (2)—Porous microspheres | 1—1.5 |
| (3)—Glass microspheres | 0.5–0.75 |
| (4)—Phenolic microspheres | 0.7–1 |
| (5)—Solid microspheres and styrene copolymer of 90 parts styrene, 10 parts divinylbenzene | 0.7–1.5 |
| (6)—No microspheres added | 1.25–1.5 |

Sample 1 differs markedly in appearance from Samples 2–6 and resembles unglazed porcelain, whereas Samples 2–6 have distinct and large cells which exhibit specular reflection. Sample 1 prepared in accordance with the invention is eminently suited for the forming of articles wherein fine surface detail is required.

Similar beneficial results are achieved when chlorostyrene such as monochlorostyrene, either an individual isomer or mixed isomers thereof, dichlorostyrenes and methyl methacrylate are employed as the polymerizable substance with volatile fluid foaming agents such as trichlorofluoromethane, trichlorotrifluoroethane with insoluble expandable microspheres such as microspheres having a polymer shell of a copolymer of 85 weight percent vinylidene chloride and 15 weight percent vinyl chloride and a polymer shell of 90 weight percent vinylidene chloride, 10 weight percent ethyl acrylate, and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A composition comprising
    (a) an unsaturated polymerizable substance which is o-chlorostyrene, m-chlorostyrene, p-chlorostyrene, dichlorostyrenes, methyl methacrylate and mixtures thereof containing up to 30 weight percent styrene based on the weight of the polymerizable substance,
    (b) a volatile liquid expanding agent present in a proportion of from about 3 to about 30 weight percent, and
    (c) 0.2 to 10 weight percent of thermoplastic synthetic resinous particles having a diameter of from about 1 to 50 microns and containing a volatile fluid foaming agent encapsulated therein as a distinct and separate liquid phase, the percentages being based on the total weight of the composition.

2. The composition of claim 1 wherein the polymerizable material is chlorostyrene.

3. The composition of claim 1 wherein the thermoplastic synthetic resinous particles are vinylidene chloride polymers.

4. The composition of claim 1 wherein the microspheres are present in a proportion from about 0.2 to 1 percent by weight.

5. A composition in accordance with claim 1 wherein the unsaturated polymerizable substance is polymerized.

6. The composition of claim 5 wherein the polymerizable substance is a chlorostyrene polymer.

7. A method for the preparation of an improved latent foaming composition, the steps of the method comprising providing a polymerizable mixture of (a) an unsaturated polymerizable substance which is o-chlorostyrene, m-chlorostyrene, p-chlorostyrene, dichlorostyrenes, methyl methacrylate and mixtures thereof with up to 30 weight percent styrene, (b) a volatile liquid expanding agent present in a proportion of from about 3 to 30 weight percent, polymerizing the mixture at a temperature below a temperature at which the volatile liquid expanding agent escapes from the mixture, subsequently heating the resultant polymerizable material to a temperature sufficiently high to cause formation of a plurality of discrete gas-containing cells therein, the improvement which comprises adding to the mixture prior to polymerization, from 0.2 to 10 weight percent of thermoplastic resinous particles having a diameter of from about 1 to 50 microns and containing a volatile fluid foaming agent encapsulated therein as a distinct and separate liquid phase, all percentages being based on the total weight of the composition.

8. The method of claim 7 wherein the polymerizable material is a chlorostyrene.

9. The method of claim 8 wherein the thermoplastic synthetic resinous particles are of a vinylidene chloride polymer.

10. The method of claim 7 including the step of dissolving within the polymerizable material a thermoplastic polymer.

References Cited

UNITED STATES PATENTS

| 3,138,478 | 6/1964 | Hedman et al. | 260—2.5(B) |
| 3,359,130 | 12/1967 | Goldman | 260—2.5(B) |
| 3,466,353 | 9/1969 | Turner | 260—2.5(B) |

MURRAY TILLMAN, Primary Examiner

W. J. BRIGGS, Sr., Assistant Examiner

U.S. Cl. X.R.

260—33.8, 884, 886